Feb. 29, 1944.  E. L. KENT  2,343,063

METHOD OF AND APPARATUS FOR MEASURING MECHANICAL VIBRATIONS

Filed Oct. 31, 1942  2 Sheets-Sheet 1

Inventor:
Earle L. Kent,
By Dawson, Ooms and Booth,
Attorneys.

Feb. 29, 1944.  E. L. KENT  2,343,063
METHOD OF AND APPARATUS FOR MEASURING MECHANICAL VIBRATIONS
Filed Oct. 31, 1942  2 Sheets-Sheet 2
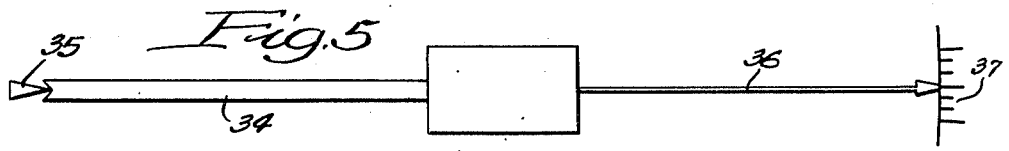
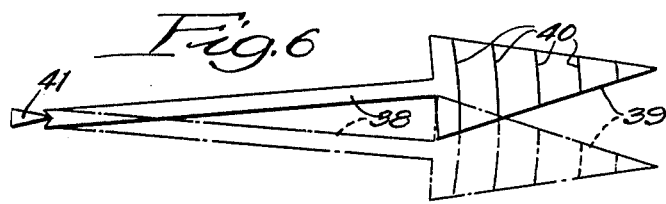
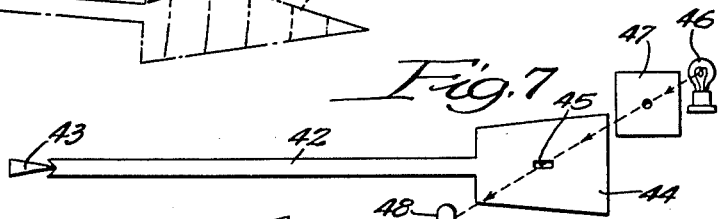
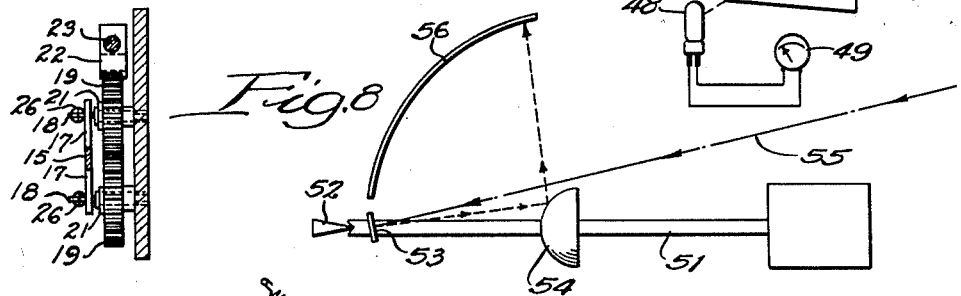
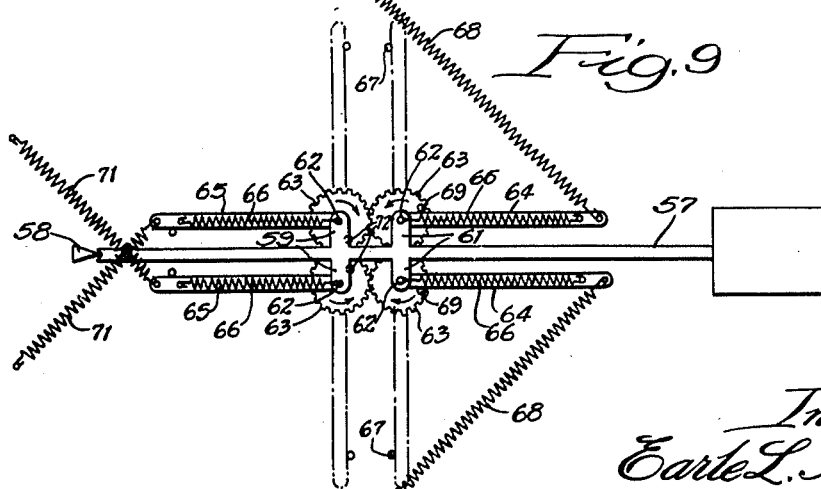
Inventor.
Earle L. Kent,
By Dawson, Ooms & Barth
Attorneys.

Patented Feb. 29, 1944

2,343,063

UNITED STATES PATENT OFFICE 2,343,063

METHOD OF AND APPARATUS FOR MEASURING MECHANICAL VIBRATIONS

Earle L. Kent, Elkhart, Ind., assignor to C. G. Conn, Ltd., Elkhart, Ind., a corporation of Indiana Application October 31, 1942, Serial No. 464,130

15 Claims. (Cl. 73—51)

This invention relates to a method of and apparatus for measuring mechanical vibrations and more particularly to the direct measurement of the frequency and amplitude of such vibrations.

One of the objects of the invention is to provide a device which is simple in structure and light in weight but which is accurate and dependable for the measurement of mechanical vibrations.

Another object of the invention is to provide a method of and apparatus for measuring mechanical vibrations in which the stiffness of a mechanical vibrating member is varied to change its resonant frequency without disturbing its neutral position. Preferably, I employ two springs acting oppositely on the member whose angles can be adjusted to vary the stiffness characteristic.

Still another object of the invention is to provide a method of and apparatus for measuring mechanical vibrations in which a mechanical vibrating member is so damped that the amplitude of its vibration is directly proportional to the amplitude of the vibration to be measured. According to one feature of the invention, this is accomplished by damping the vibrating member by angularly adjustable springs whose longitudinal vibration is, in turn, damped.

A further object of the invention is to provide a method of and apparatus for measuring mechanical vibrations in which the amplitude of vibration of a mechanical vibrating member is clearly and accurately indicated to indicate the amplitude of the vibration to be measured.

The above and other objects and advantages of the invention will be more readily apparent from the following description when read in connection with the accompanying drawings, in which—

Figures 5, 6, 7 and 8 are diagrammatic views illustrating different types of indicating means for indicating the amplitude of vibration;

Figure 9 is a diagrammatic view similar to Figure 2 of an alternative construction; and Figure 10 is an end view with parts in section, looking from the right of Figure 2.

The underlying principle of the invention is a mechanical system which is resonant or can be made to be resonant at the frequency of the vibration it is desired to measure. The frequency of the system depends upon its mass and stiffness and in order to make the system resonant at any desired frequency, means are provided to vary the stiffness of the system.

Figure 1:
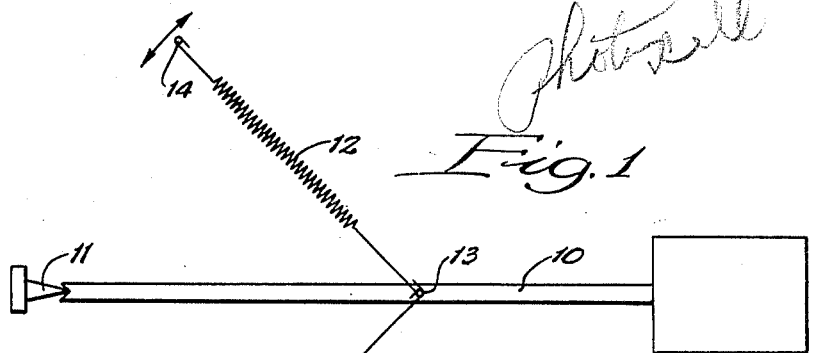
Figure 1 is a diagrammatic view illustrating the principles of the invention.

As shown in Figure 1, the system may comprise an elongated vibratory member 10 pivoted at 11 and adapted to oscillate about 11 in response to a vibration impressed at the pivot point. Vibratory movement of the member 10 is opposed by a pair of tension springs 12 pivotally connected to the member 10 at 13 and supported at their outer ends on pins or like supports 14. With the springs in the angular position shown in Figure 1, the member 10 will be resonant at a given frequency dependent upon its own mass and length and the effective stiffness of the opposed springs 12. To adjust or vary the resonant frequency of the member 10, the effect of the springs thereon may be varied. This is preferably accomplished by varying the angle of the springs relative to the direction of vibration and since it is substantially impossible to obtain springs which are exactly uniform throughout, the spring angles should be varied without changing their tension. According to the present invention, this is accomplished by moving the supporting pins 14 in arcuate paths about the pin 13 as a center. In this way, the tension of the springs is not changed but their effect on the member 10 is changed in accordance with their angular positions so that the resonant frequency of the system will be changed.

Figure 2:
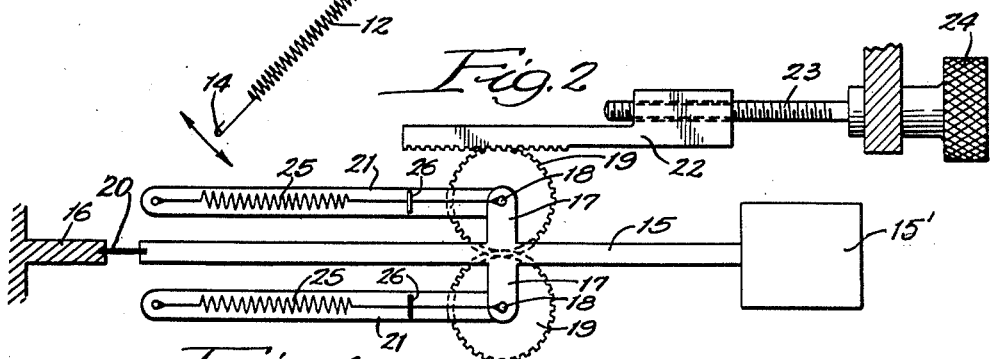
Figure 2 is a diagrammatic view showing one type of apparatus for carrying out the invention.

One particular construction embodying the principles described in connection with Figure 1 is shown in Figure 2 comprising an elongated vibratory member 15 weighted at its free end by mass 15' pivoted to a support 16 which may be subjected to the vibrations to be measured. The member 15 is formed with two oppositely extending ears 17 having pins 18 thereon coaxial with a pair of intermeshing gears 19 mounted adjacent the member 15. The gears 19 carry arms 21 extending therefrom and adapted to move from a position parallel to the member 15 as shown to a position substantially at right angles thereto. This movement may be controlled by a rack 22 meshing with one of the gears 19 and moved by a screw 23 turned through a knob 24. Any suitable indicating means, not shown, may be provided to indicate the angular position of the arms 21 and thereby the natural frequency of the system. The arms 21 carry tension springs 25 supported at the outer ends of the arms and pivotally connected to the pins 18. As the rack 22 is moved, the gears 19 and the arms 21 will be turned simultaneously to vary the angle of the springs 25 with respect to the member 15 thereby to vary the damping characteristic of the springs.

In a system of the type so far described, if the vibration to be measured is impressed on the pivot support 16 to cause it to vibrate in a vertical direction at a frequency F, no appreciable vibration of the member 15 will occur unless its effective mass and the stiffness of the spring system are such as to cause it to be resonant at the frequency F. An undamped system has its natural frequency $$F_n = \frac{1}{2\pi\sqrt{LC}}$$

where L is equal to the compliance of the system, or the reciprocal of its stiffness, in centimeters per dyne, and C is the mass of the system in grams. If the system had no mechanical resistance or damping the amplitude of the vibrating member 15 would approach infinity as the system approached resonance. However, some damping effect is provided due to friction in the fulcrum, windage and hysteresis of the springs so that the amplitude of the vibrating member reaches a definite maximum at resonance. The expression for the damped natural frequency is $$F_{nd} = \frac{1}{2\pi}\sqrt{\frac{1}{LC} - \left(\frac{2C}{K}\right)^2}$$

where K is the damping coefficient. The expression for the maximum amplitude of the effective mass at resonance is $$(S_0)_{res} = \frac{I_0 R}{\omega} = CS_0'\omega R$$

where $I_0$ is the force applied to the pivot support 16 and arms 21, R is the responsiveness of the system or the reciprocal of the resistance of the system, $\omega$ is $2\pi f$, $S_0'$ is the maximum amplitude of the exciting force.

From this it will be seen that for a constant mass C and a constant responsiveness R, the maximum amplitude $(S_0)_{res}$ of the mass will be proportional to the amplitude of the exciting force $S_0'$ and the frequency. It is highly desirable that the maximum amplitude of the mass or member 15 should be proportional to the amplitude of the exciting force but in order that the amplitude of the exciting force may be conveniently measured, it is undesirable for the amplitude of vibration of the mass to be dependent upon the frequency.

In order to remedy this response characteristic and to give the instrument a flat characteristic with respect to frequency, it is necessary to vary the responsiveness factor R in such a way as to make it inversely proportional to frequency. In other words, as the frequency of vibration is increased, the damping factor 1/R should be increased to dissipate the extra energy due to increase frequency to keep the amplitude $S_0'$ constant.

In the apparatus of Figure 2, this damping effect may be provided by fastening small flat discs 26 to the springs 25 lying transverse to the longitudinal axis of the springs. These discs may move through air as shown or may be formed to move in liquid containers to increase the damping action. With the arms 21 parallel or substantially parallel to the member 15 as shown, the discs will move edgewise through the surrounding fluid and will offer very little resistance to motion. However, as the arms 21 are turned more nearly to a position at right angles to the member 15, the motion of the springs will be in a direction along their axis so that the discs will be moved more nearly flatwise through the surrounding medium to offer increased resistance. Thus, these discs tend to increase the damping factor as the arms 21 are turned to a 90° position corresponding to the position they will assume at high frequency vibrations to maintain the amplitude of the system substantially independent of the frequency of the vibrations.

Figure 3:
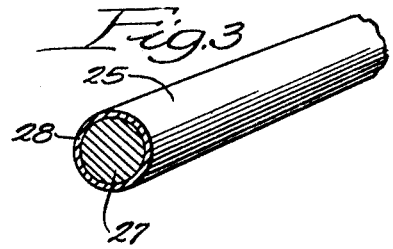
Figure 3 is an enlarged perspective view with parts in section of a damped spring according to the invention.

Figure 3 illustrates an alternative construction for producing this damping effect which may be used in place of or in conjunction with the discs 26 shown in Figure 2. In this construction the springs 25 are formed of spring wire of any desired type indicated at 27 and which normally has a very low damping factor. To increase the damping factor, the spring wire 27 may be coated with a damping material 28, any material having a good damping factor being suitable for this purpose. One satisfactory material is a lead plating over the spring wire, the resistance factor of the coating being easily determinable by varying or controlling the thickness of the lead plating.

In using this construction when the arms 21 are in the parallel position shown in Figure 2, the springs stretch and contract very little as the member 15 vibrates so that the lead coating produces very little damping effect. However, as the springs are turned toward their 90° position, they will be stretched and contracted to a much greater extent so that the lead coating will offer increased resistance and will produce the desired damping action on the springs.

In the position in which arms 21 lie substantially parallel to the member 15, the springs have little or no effect on the stiffness or damping of the system. In order to increase the stiffness of the system in this position and to introduce a damping factor to limit the amplitude of vibration of the member 15, the pivotal connection between the member and the frame 16 may be made by a spring 20 which is caused to deflect as the member moves. The stiffness of this spring has a considerable influence on the resonant frequency of the member when the arms 21 are in or near their parallel position and its damping properties influence the maximum amplitude of the member. However as the arms are turned toward their 90° position the effect of the spring 20 becomes relatively less important.

The expression for $(S_0)_{res}$ shows that the maximum amplitude of the mass at resonance is dependent upon the mass C and it has been shown that the resonant frequency also depends upon the mass. Therefore, in order to make a system resonate at some particular frequency, we have our choice of compliance L and mass C as long as the product is right to satisfy the equation for the resonant frequency. On the other hand, if we make C large and L small, the system will have a greater sensitivity than one in which C is small and L is large provided R is constant in both cases. Since R is a controlled factor, the responsiveness of this instrument may be readily controlled. This same control of parameters controls the sharpness of the resonance curve. Maximum sensitivity yields maximum sharpness of the resonance curve. This is shown in the expression $$S_0 = \frac{I_0 L}{\sqrt{\left(1 - \frac{\omega^2}{\omega_n^2}\right)^2 + \left(\frac{2R_c}{R} \times \frac{\omega}{\omega_n}\right)^2}}$$

where $\omega_n = 2\pi f_n$
$f_n$ = resonant frequency
$R_c$ = critical responsiveness
  = reciprocal of critical damping
$$= \frac{1}{2\sqrt{2\frac{C}{L}}} = \frac{1}{2C\omega_n}$$

The factors R, L, and C are made such as to produce the desired frequency range, desired sensitivity, and desired sharpness of tuning. The sharpness of tuning and sensitivity however vary together, so if a certain resonance curve is considered desirable from the standpoint of ease of tuning and the separation of the desired vibration frequency from undesired vibration frequencies, then the sensitivity is also definitely established; that is, that the motion of the effective mass for a given amount of amplitude of the excitation force is definitely limited by the sharpness of the resonance curve.

Figure 4:
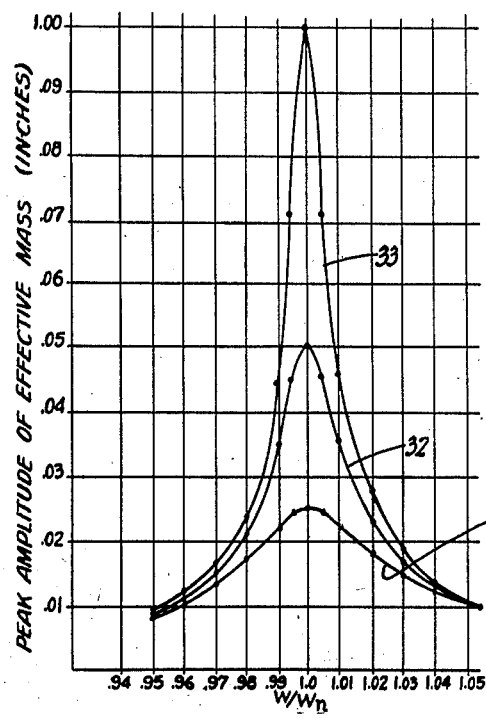
Figure 4 is a graph illustrating the operation of the invention.

Examples of curves showing this are found in Figure 4. In this figure, for the lowermost curve 31

$$\mu = 25 \text{ and } \frac{R_c}{R} = 200$$

for the intermediate curve 32

$$\mu = 50 \text{ and } \frac{R_c}{R} = 100$$

and for the uppermost curve 33

$$\mu = 100 \text{ and } \frac{R_c}{R} = 50$$

All of these curves were obtained with an instrument in which $S_0' = .001''$, $L = 5.8$ lb./'', $f_n = 10$ cps., $\omega_n = 62.8$ rad., $R_c = 182$ in./sec./lb., $C = 4.36 \times 10^{-5}$ lb./g., and $$\mu = \frac{S_0(res)}{S_0'}$$

Figure 5 illustrates one simple method of indicating the amplitude of vibration of the vibratory member. As shown in this figure, a vibratory arm 34 is pivoted at 35 and carries an extension pointer 36 of relatively small mass movable over a scale 37. The scale may be graduated in thousands of an inch or in any other desired graduations and may be read fairly easily due to amplified movement of the pointer 36 resulting from its length.

Figure 6 illustrates an alternative indicating method in which the elongated member 38 is formed with a tapered wedged shape head 39 having a series of calibration lines 40 thereon concentric with the pivot 41. As the member vibrates persistence of vision enables it to be seen in its two extreme positions simultaneously as indicated by the full and dotted line positions as shown in Figure 6, so that the calibration line at the point of intersection of the apparent adjacent edges in the two positions can easily be read. It will be understood that instead of providing the head 39 with straight edges as shown, the edges could be made according to any desired curve to give the scale a logarithmical or other characteristic. Due to the fact that scale lines are printed directly on the vibratory member in this case, any error due to parallax is eliminated.

Another indicating system is illustrated in Figure 7 in which the member 42 pivoted at 43 carries a head 44 having a shutter opening 45 therein. A beam of light from a lamp 46 is directed through a screen 47 and through the shutter opening 45 to act on a photocell 48 which is preferably of the self generating direct current type and which operates a microammeter 49. The shutter opening 45 may be so arranged that when the member 42 is in its neutral position, no light reaches the photocell but as the shutter is displaced due to vibration a greater amount of light will reach the cell as the amplitude increases. With this system the meter 49 may be calibrated to read directly in amplitude. Another variation is to so arrange the shutter that when the member 42 is in its neutral position maximum light strikes the photocell and causes the meter to read maximum. As the shutter is moved more or less light is cut off dependent upon the amplitude of vibration so that the meter 49 will decrease its reading in proportion to the amplitude of vibration. With a system of this character, the lamp circuit can be adjusted through a rheostat or the like to adjust the light intensity so that full scale deflection of the meter will be obtained in the neutral position of the instrument. Still another variation possible with this system is to so arrange the shutter that approximately half of the light available strikes the photocell when the member 42 is in its neutral position. As the shutter oscillates the instantaneous value of the light striking the cell will increase and decrease thereby generating an alternating voltage which may be applied through a transformer or condenser to an A. C. meter.

Figure 8 shows still another indicating system in which a vibratory member 51 pivoted at 52 carries a small flat mirror 53 adjacent its pivot point and a convex mirror 54 intermediate its ends. A beam of light indicated at 55 is directed onto the mirror 53 and is reflected onto the convex mirror 54. When the member 51 is in its neutral postiion, the beam may be directed at the lower or zero end of a translucent curved scale 56 and as the member is deflected from its neutral position, the beam will be deflected more and more toward the opposite end of the scale due to movement of the convex mirror 54. By this means a highly multiplied motion may be obtained.

In all of these indicating devices it is highly desirable that the neutral position of the vibratory member be maintained constant. In any mechanical system of this sort the member tends to deflect to some extent due to its own weight and, in order that it may always be returned to the same horizontal position, the uppermost one of the pair of springs acting on it may be advanced slightly ahead of the lower spring.

Figure 9 illustrates an arrangement for obtaining a somewhat greater range than is possible with the instrument illustrated in Figure 2. In this construction, the member 57 pivoted at 58 has two pairs of oppositely projecting ears 59 and 61 at slightly spaced points thereon. Each of the ears carries a pin 62 and four intermeshing gears 63 are mounted adjacent the member coaxial with the pins 62 respectively. Pairs of arms 64 and 65 are loosely mounted coaxial with the gears 63 on opposite sides of the member 57 and each arm carries a tension spring 66 which may be constructed as shown in Figure 3. The springs are connected to the pins 62 respectively and to the outer ends of the arms.

The arms 64 are normally urged to a position at right angles to the member 57 against stops 67 by springs 68 and are adapted to be moved inwardly to a position parallel to the member by pins 69 on the corresponding gears 63. The arms 65 are normally urged to a position parallel with the member by springs 71 and are adapted to be moved outwardly to a right angular position by pins 72 on the corresponding pair of gears 63, the pins 72 being spaced 90° from the pins 69.

In operation the parts are shown in the position for minimum frequency and in order to increase the natural frequency of the system the gears are turned in the direction of the arrows thereon to move the pins 69 counter-clockwise away from the arms 64. This allows the springs 68 to move the arms 64 more nearly against the stops 67 and at the time the arms 64 reach these stops so that the springs 66 thereon will have their maximum effectiveness, the pins 72 have just moved into engagement with the arms 65. Upon further turning of the gears, the arms 65 will be moved out toward a right angle position to increase their effectiveness until finally all four of the arms are in a right angle position at maximum effectiveness. This construction materially increases the range of the instrument, substantially doubling the range of the structure shown in Figure 2 by providing an additional pair of springs the pairs being brought successively into operation.

While I have illustrated and described in detail several embodiments of the invention, it will be understood that these are illustrative only and are not intended to be taken as a definition of the scope of the invention, reference being had to the appended claims for this purpose.

What is claimed is:

1. The method of measuring mechanical vibrations which comprises pivoting an elongated rigid member adjacent one end, subjecting the member to the mechanical vibrations to be measured, applying a resilient force to the member acting in the plane of movement of the member at a point spaced from the pivotal mounting to influence vibration thereof, and varying the effect of the force on the member to vary the resonant frequency thereof.

2. The method of measuring mechanical vibrations which comprises pivoting an elongated rigid member adjacent one end, subjecting the member to the mechanical vibrations to be measured, applying a resilient force to the member to influence vibration thereof, and varying the effective angle of the force relative to the member, without varying its initial amplitude, to vary the resonant frequency of the member.

3. The method of measuring mechanical vibrations which comprises pivoting an elongated rigid member adjacent one end, subjecting the member to the mechanical vibrations to be measured, applying opposing forces to the member to influence vibration thereof, varying the effective angle of the forces relative to the member, without varying their initial amplitude, to vary the resonant frequency of the member, and variably damping the forces at different angles.

4. The method of measuring mechanical vibrations which comprises pivoting an elongated rigid member adjacent one end, subjecting the member to the mechanical vibrations to be measured, applying opposing forces to the member to influence vibration thereof, varying the effective angle of the forces relative to the member, without varying their initial amplitude, to vary the resonant frequency of the member, and damping the forces only in directions colinear with the lines of action thereof.

5. Apparatus for measuring mechanical vibrations comprising an elongated rigid member pivoted adjacent one end and adapted to be subjected to the vibrations to be measured, resilient means connected to the member on opposite sides thereof at a point spaced from the pivot and yieldingly urging the member to a neutral position, and adjustable supporting means for the resilient means adjustable to vary the effect thereof on the member.

6. Apparatus for measuring mechanical vibrations comprising an elongated rigid member pivoted adjacent one end and adapted to be subjected to the vibrations to be measured, resilient means connected to the member on opposite sides thereof and yieldingly urging the member to a neutral position, and angularly adjustable supporting means for the resilient means angularly adjustable to vary the effective angle of the resilient means relative to the member, without varying the normal tension of the resilient means.

7. Apparatus for measuring mechanical vibrations comprising an elongated rigid member pivoted adjacent one end and adapted to be subjected to the vibrations to be measured, springs pivotally connected to the member and extending from opposite sides thereof, arms pivotally movable about centers coaxial with the pivotal connections of the springs to the member, and means for simultaneously turning the arms in opposite directions.

8. Apparatus for measuring mechanical vibrations comprising an elongated rigid member pivoted adjacent one end and adapted to be subjected to the vibrations to be measured, springs pivotally connected to the member and extending from opposite sides thereof, arms pivotally movable about centers coaxial with the pivotal connections of the springs to the member, the spring being connected to the arms at points spaced from their pivotal centers, means for simultaneously turning the arms in opposite directions, and means associated with the springs for damping vibrations of the member to different degrees in different angular positions of the springs.

9. Apparatus for measuring mechanical vibrations comprising an elongated rigid member pivoted adjacent one end and adapted to be subjected to the vibrations to be measured, springs pivotally connected to the member and extending from opposite sides thereof, arms pivotally movable about centers coaxial with the pivotal connections of the springs to the member, the spring being connected to the arms at points spaced from their pivotal centers, means for simultaneously turning the arms in opposite directions, and flat discs secured to the springs lying transverse to their length to dampen longitudinal vibrations of the springs without substantially affecting transverse vibrations.

10. Apparatus for measuring mechanical vibrations comprising an elongated rigid member pivoted adjacent one end and adapted to be subjected to the vibrations to be measured, springs pivotally connected to the member and extending from opposite sides thereof, arms pivotally movable about centers coaxial with the pivotal connections of the springs to the member, the spring being connected to the arms at points spaced from their pivotal centers, means for simultaneously turning the arms in opposite directions, the springs comprising coils of spring wire coated with damping material to dampen longitudinal vibrations of the springs.

11. Apparatus for measuring mechanical vibrations comprising an elongated rigid member pivoted adjacent one end and adapted to be subjected to the vibrations to be measured, a pair of intermeshing gears adjacent the member carrying elongated arms, tension springs connected to the arms and to the member at points coaxial with the gears respectively, and means to turn one of the gears thereby to move the arms simultaneously in opposite rotational directions.

12. Apparatus for measuring mechanical vibrations comprising an elongated rigid member pivoted adjacent one end and adapted to be subjected to the vibrations to be measured, four intermeshing gears adjacent the member, arms pivotally mounted coaxial with the gears, pins on two of the gears on opposite sides of the member urging the corresponding arms into a position parallel to the member, resilient means urging said arms to a position at right angles to the member, resilient means urging the other two arms to a position parallel to the member, pins on the other two gears offset 90° from the first pins engageable with said other two arms to move them toward a position at right angles to the member, means to turn one of the gears successively to move the arms in pairs, and springs carried by the arms respectively and connected to the member at points coaxial with the corresponding gears.

13. Apparatus for measuring mechanical vibrations comprising an elongated rigid member pivoted adjacent one end and adapted to be subjected to the vibrations to be measured, resilient means connected to the member on opposite sides thereof and yieldingly urging the member to a neutral position, means for adjusting the angular position of the resilient means relative to the member, means for damping longitudinal vibrations of the resilient means, and indicating means associated with the member to indicate the magnitude of the vibrations thereof.

14. Apparatus for measuring mechanical vibrations comprising an elongated vibratory member, a leaf spring secured to said member adjacent one end and pivotally supporting it, resilient means connected to the member at a point spaced from the leaf spring and yieldingly urging the member to a neutral position, and means for varying the angle of the resilient means relative to the member to vary the resonant frequency thereof.

15. Apparatus for measuring mechanical vibrations comprising an elongated vibratory member, means pivotally supporting the member adjacent one end, a spring connected to the member at a point spaced from the pivot, and means for adjusting the angle of the spring without varying its initial tension to change the resonant frequency of the member.

EARLE L. KENT.